(12) United States Patent
Shimada et al.

(10) Patent No.: US 6,590,035 B2
(45) Date of Patent: Jul. 8, 2003

(54) WATER REPELLENT COMPOSITION

(75) Inventors: Toyomichi Shimada, Yokohama (JP); Kyoichi Kaneko, Yokohama (JP); Takashige Maekawa, Yokohama (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 09/984,401

(22) Filed: Oct. 30, 2001

(65) Prior Publication Data

US 2002/0107327 A1 Aug. 8, 2002

(30) Foreign Application Priority Data

Oct. 31, 2000 (JP) ........................................ 2000-333065

(51) Int. Cl.$^7$ ............................................... C08L 27/12
(52) U.S. Cl. ...................................... 525/199; 525/200
(58) Field of Search .................................. 525/199, 200

(56) References Cited

U.S. PATENT DOCUMENTS

| | | | |
|---|---|---|---|
| 4,032,495 A | * | 6/1977 | Perronin et al. ............. 525/191 |
| 5,688,309 A | | 11/1997 | Shimada et al. |
| 5,753,569 A | | 5/1998 | Michels et al. |
| 6,177,531 B1 | | 1/2001 | Shimada et al. |
| 6,251,984 B1 | | 6/2001 | Shimada et al. |

FOREIGN PATENT DOCUMENTS

| | | |
|---|---|---|
| EP | 0 713 939 | 5/1996 |
| GB | 988 473 | 4/1965 |
| GB | 1 010 539 | 11/1965 |
| GB | 1 040 035 | 8/1966 |
| GB | 1 433 524 | 4/1976 |

OTHER PUBLICATIONS

R. F. Linemann, et al., Macromolecules, vol. 32, No. 6, pp. 1715–1721, "Latex Blends of Fluorinated and Fluorine–Free Acrylates: Emulsion Polymerization and Tapping Mode Atomic Force Microscopy of Film Formation", Mar. 23, 1999.

* cited by examiner

*Primary Examiner*—Nathan M. Nutter
(74) *Attorney, Agent, or Firm*—Oblon, Spivak, McClelland, Maier & Neustadt, P.C.

(57) ABSTRACT

A water repellent composition is provided containing the polymers (A) and (B), wherein polymers (A) and (B) are not present in the same particles, wherein polymer (A) is an addition polymer having at least 60 mass % of polymerized units of a (meth)acrylate (a) having a polyfluoroalkyl group, and 0–40 mass % of a methacrylate (b) having a long chain alkyl group and not a polyfluoroalkyl group, and, if necessary, polymerized units of a polymerizable monomer (x) other than monomers (a) and (b), polymer (B) is an addition polymer having 0–60 mass % of monomer (a), and at least 30 mass % of polymerized units of a polymerizable monomer (c), other than monomers (a) and (b), and, if necessary, polymerized units of a monomer (y) other than monomers (a) and (c), along with an article treated therewith and the method of treating an article with the water repellent composition.

13 Claims, No Drawings

WATER REPELLENT COMPOSITION

The present invention relates to a water repellent composition.

As water repellent treatment has become common, the performance required for fibers has been increasingly high. In recent years, it is required that fibers will exhibit a high level of water repellency continuously even under severe conditions in outdoor applications such as mountain climbing and skiing. Against such requirement, the following methods of treating fibers have been proposed.

(1) A method of treating fibers by means of an aqueous dispersion containing a fluorine-containing copolymer and a water-soluble amino resin (such as an N-methylol-modified melamine resin) (JP-A-56-165072).

(2) A method of treating fibers by means of a treating agent comprising a fluorine-containing copolymer and an isocyanate compound (JP-A-61-19684).

(3) A method of treating fibers by means of an aqueous dispersion containing a fluorine-containing copolymer having isocyanate groups and hydroxyl groups, and a blocked isocyanate compound (U.S. Pat. No. 4,834,764).

However, these methods have been still inadequate to realize excellent water repellency and its durability required for fibers at a practical level.

It is an object of the present invention to provide a water repellent composition which is capable of imparting excellent water repellency and its durability to an article such as fibers.

The present invention provides a water repellent composition comprising the following polymer (A) and the following polymer (B), wherein the polymer (A) and the polymer (B) are not present in the same particles:

Polymer (A): an addition polymer comprising at least 60 mass % of polymerized units of the following polymerizable monomer (a) and at most 40 mass % (inclusive of 0 mass %) of polymerized units of the following polymerizable monomer (b), and, if necessary, polymerized units of a polymerizable monomer (x) other than the polymerizable monomers (a) and (b), wherein the total of the polymerized units of the polymerizable monomer (a) and the polymerized units of the polymerizable monomer (b) is at least 70 mass %; and Polymer (B): an addition polymer comprising less than 60 mass % (inclusive of 0 mass %) of polymerized units of the polymerizable monomer (a) and at least 30 mass % of polymerized units of the following polymerizable monomer (c), and, if necessary, polymerized units of a polymerizable monomer (y) other than the polymerizable monomers (a) and (c), wherein the total of the polymerized units of the polymerizable monomer (a) and the polymerized units of the polymerizable monomer (c) is at least 50 mass %:

Polymerizable monomer (a): a (meth)acrylate having a polyfluoroalkyl group;

Polymerizable monomer (b): a (meth)acrylate having a long chain alkyl group and not having a polyfluoroalkyl group; and Polymerizable monomer (c): a polymerizable monomer other than the polymerizable monomers (a) and (b), having a SP value of less than 10.

Further, the present invention provides an article treated with such a water repellent composition.

Now, the present invention will be described in detail with reference to the preferred embodiments.

In this specification, acrylic acid and methacrylic acid will generally be represented by (meth)acrylic acid. The same will apply with respect to a representation such as a (meth)acrylate. Further, a polyfluoroalkyl group is represented by a $R^f$ group.

Polymer (A) is an addition polymer comprising at least 60 mass % of polymerized units of the polymerizable monomer (a) and at most 40 mass % (inclusive of 0 mass %) of polymerized units of the polymerizable monomer (b), and, if necessary, polymerized units of a polymerizable monomer (x) other than the polymerizable monomers (a) and (b), wherein the total of the polymerized units of the polymerizable monomer (a) and the polymerized units of the polymerizable monomer (b) is at least 70 mass %. Namely, polymer (A) may not contain polymerized units of the polymerizable monomer (b).

The polymerizable monomer (a) (hereinafter referred to as the monomer (a)) is a (meth)acrylate having a $R^f$ group. The (meth)acrylate having a $R^f$ group means a compound wherein the $R^f$ group is present in the alcohol residue moiety of a (meth)acrylic acid ester.

The $R^f$ group is a group having at least two hydrogen atoms of an alkyl group substituted by fluorine atoms. The carbon number of the $R^f$ group is preferably from 2 to 20, particularly preferably from 6 to 16. If the carbon number is less than 2, the water repellency tends to be low, and if it exceeds 20, the monomer (a) tends to be solid at room temperature, and its sublimation property tends to be high, whereby handling tends to be difficult.

Further, the $R^f$ group may be of a straight chain structure or a branched structure, but a straight chain structure is preferred. In the case of a branched structure, it is preferred that the branched moiety is present at the terminal portion of the $R^f$ group, and the branched moiety is a short chain having a carbon number of from about 1 to 4.

Further, the $R^f$ group may contain, in addition to fluorine atoms, other halogen atoms. As such other halogen atoms, chlorine atoms are preferred. Further, an etheric oxygen atom or a thioetheric sulfur atom may be inserted between a carbon—carbon bond in the $R^f$ group. The structure of the terminal portion of the $R^f$ group may, for example, be $CF_3CF_2$—, $(CF_3)_2CF$—, $CHF_2$—, $CH_2F$— or $CCl\,F_2$—. $CF_3CF_2$— is preferred.

The number of fluorine atoms in the $R^f$ group is preferably at least 60%, particularly preferably at least 80%, as represented by [(number of fluorine atoms in the $R^f$ group)/(number of hydrogen atoms contained in the corresponding alkyl group having the same carbon number as the $R^f$ group)]×00(%). As the $R^f$ group, a perfluoroalkyl group (hereinafter referred to as a $R^F$ group) is preferred. As the RF group, preferred is a $R^F$ group having a straight chain structure i.e. a group represented by $F(CF_2)_i$— (wherein i is an integer of from 2 to 20). Particularly preferred is a group wherein i is an integer of from 6 to 16.

Specific examples of the $R^f$ group will be given below. The following examples include structurally isomeric groups i.e. groups which have the same molecular formula but have different structures.

$C_4F_9$—[$F(CF_2)_4$—, $(CF_3)_2CFCF_2$—, $(CF_3)_3C$—], $C_5F_{11}$—[such as $F(CF_2)_5$— or $(CF_3)_3CCF_2$—], $C_6F_{13}$— [such as $F(CF_2)_6$—], $C_7F_{15}$—, $C_8H_{17}$—, $C_9F_{19}$—, $C_{10}F_{21}$—, $Cl(CF_2)_t$—, $H(CF_2)_t$— (t is an integer of from 2 to 20), $(CF_3)_2CF(CF_2)_y$— (y is an integer of from 1 to 17), etc.

Specific examples of a case where the $R^f$ group is a group having an etheric oxygen atom or a thioetheric sulfur atom inserted between a carbon—carbon bond, will be given below, wherein r is an integer of from 1 to 5, z is an integer of from 1 to 6, and w is an integer of from 1 to 9.

$F(CF_2)_5OCF\,(CF_3)$—, $F[CF(CF_3)CF_2O]_rCF(CF_3)CF_2CF_2$—, $F[CF(CF_3)CF_2O]_zCF(CF_3)$—, $F[CF(CF_3)CF_2O]_zCF_2CF_2$—, $F(CF_2CF_2CF_2O)_zCF_2CF_2$—, $F(CF_2CF_2O)_zCF_2CF_2$—, etc.

F(CF$_2$)$_5$SCF(CF$_3$)—, F[CF(CF$_3$)CF$_2$S]$_r$CF(CF$_3$)CF$_2$CF$_2$—, F[CF(CF$_3$)CF$_2$S]$_z$CF(CF$_3$)—, F[CF(CF$_3$)CF$_2$S]$_z$CF$_2$CF$_2$—, F(CF$_2$CF$_2$CF$_2$S)$_z$CF$_2$CF$_2$—, F(CF$_2$CF$_2$S)$_w$CF$_2$CF$_2$—, etc.

As the monomer (a), a compound represented by the following formula 1 is preferred. However, in the formula 1, R$^f$ is a R$^f$ group, Q is a bivalent organic group, and R$^1$ is a hydrogen atom or a methyl group.

R$^f$—Q—OCOCR$^1$=CH$_2$        Formula 1

In the formula 1, Q is preferably, for example, —(CH$_2$)$_{p+q}$—, —(CH$_2$)$_p$CONH(CH$_2$)$_q$—, —(CH$_2$)$_p$OCONH(CH$_2$)$_q$—, —(CH$_2$)$_p$SO$_2$NR$^2$(CH$_2$)$_q$—, —(CH$_2$)$_p$NHCONH(CH$_2$)$_q$—, or —(CH$_2$)$_p$CH(OH)(CH$_2$)$_q$—, wherein R$^2$ is a hydrogen atom or an alkyl group, and each of p and q is an integer of 0 or more, provided that p+q is an integer of from 1 to 22.

Among them, preferred is —(CH$_2$)$_{p+q}$—, —(CH$_2$)$_p$CONH(CH$_2$)$_q$— or —(CH$_2$)$_p$SO$_2$N$^{R2}$(CH$_2$)$_q$—, wherein q is an integer of at least 2, provided that p+q is from 2 to 6. Particularly preferred is —(CH$_2$)$_{p+q}$— wherein p+q is from 2 to 6, i.e. a dimethylene group, a trimethylene group, a pentamethylene group or a hexamethylene group. Further, it is preferred that fluorine atoms are bonded to the carbon atom of R$^f$ bonded to Q.

The following compounds may preferably be mentioned as specific examples of the monomer (a), wherein R$^1$ is a hydrogen atom or a methyl group.

F(CF$_2$)$_2$(CH$_2$)$_2$OCOCR$^1$=CH$_2$,
F(CF$_2$)$_4$(CH$_2$)$_2$OCOCR$^1$=CH$_2$,
F(CF$_2$)$_5$CH$_2$OCOCR$^1$=CH$_2$,
H(CF$_2$)$_6$CH$_2$OCOCR$^1$=CH$_2$,
F(CF$_2$)$_6$(CH$_2$)$_2$OCOCR$^1$=CH$_2$,
H(CF$_2$)$_8$CH$_2$OCOCR$^1$=CH$_2$,
H(CF$_2$)$_8$(CH$_2$)$_2$OCOCR$^1$=CH$_2$,
F(CF$_2$)$_8$(CH$_2$)$_3$OCOCR$^1$=CH$_2$,
F(CF$_2$)$_8$(CH$_2$)$_4$OCOCR$^1$=CH$_2$,
F(CF$_2$)$_9$(CH$_2$)$_2$OCOCR$^1$=CH$_2$,
H(CF$_2$)$_{10}$CH$_2$OCOCR$^1$=CH$_2$,
F(CF$_2$)$_{10}$(CH$_2$)$_2$OCOCR$^1$=CH$_2$,
F(CF$_2$)$_{12}$(CH$_2$)$_2$OCOCR$^1$=CH$_2$,
(CF$_3$)$_2$CF(CF$_2$)$_4$(CH$_2$)$_2$OCOCR$^1$=CH$_2$,
(CF$_3$)$_2$CF(CF$_2$)$_6$(CH$_2$)$_2$OCOCR$^1$=CH$_2$,
(CF$_3$)$_2$CF(CF$_2$)$_8$(CH$_2$)$_2$OCOCR$^1$=CH$_2$,
F(CF$_2$)$_8$SO$_2$N(CH$_3$)(CH$_2$)$_2$OCOCR$^1$=CH$_2$,
F(CF$_2$)$_8$SO$_2$N(C$_2$H$_5$)(CH$_2$)$_2$OCOCR$^1$=CH$_2$,
F(CF$_2$)$_8$SO$_2$N(C$_3$H$_7$)(CH$_2$)$_2$OCOCR$^1$=CH$_2$,
F(CF$_2$)$_8$CONH(CH$_2$)$_2$OCOCR$^1$=CH$_2$,
F(CF$_2$)$_g$CONH(CH$_2$)$_2$OCOCR$^1$=CH$_2$,
(CF$_3$)$_2$CF(CF$_2$)$_5$(CH$_2$)$_3$OCOCR$^1$=CH$_2$,
(CF$_3$)$_2$CF(CF$_2$)$_5$CH$_2$CH(OCOCH$_3$)OCOCR$^1$=CH$_2$,
(CF$_3$)$_2$CF(CF$_2$)$_5$CH$_2$CH(OH)CH$_2$OCOCR$^1$=CH$_2$,
(CF$_3$)$_2$CF(CF$_2$)$_7$CH$_2$CH(OH)CH$_2$OCOCR$^1$=CH$_2$.

The monomer (a) may be two or more (meth)acrylates having R$^f$ groups. In such a case, they are preferably (meth)acrylates having R$^f$ groups having different carbon numbers.

The polymerizable monomer (b) (hereinafter referred to as a monomer (b)) is a (meth)acrylate having a long chain alkyl group and having no R$^f$ group. The (meth)acrylate having a long chain alkyl group is a compound wherein a long chain alkyl group is present in the alcohol residue moiety of a (meth)acrylic acid ester. The long chain alkyl group is preferably an alkyl group of a straight chain structure having a carbon number of at least 12.

As specific examples of the monomer (b), dodecyl (meth)acrylate, hexadecyl (meth)acrylate, octadecyl (meth)acrylate, icosyl (meth)acrylate, docosyl (meth)acrylate and tetracosyl (meth)acrylate are preferably mentioned. The monomer (b) may be two or more polymerizable monomers having long chain alkyl groups and having no R$^f$ group.

In a case where polymer (A) contains polymerized units of the monomer (b), the mass ratio of polymerized units of the monomer (a)/polymerized units of the monomer (b) is preferably at least 2.

If necessary, polymer (A) may contain polymerized units of a polymerizable monomer (x) (hereinafter referred to as a monomer (x)) other than the polymerized monomers (a) and (b). At least one type of polymerized units of such a monomer (x) is preferably polymerized units of the polymerizable monomer (c). The polymerizable monomer (c) (hereinafter referred to as a monomer (c)) is a polymerizable monomer having a SP value of less than 10 and is a monomer other than the monomer (a) or (b).

As a calculation method for the SP value, a method by Fedors (1974) is employed. Namely, when the cohesive energy of each constituting unit of the monomer is represented by e and the molar volume by v, the cohesive energy E of the monomer is calculated by E=Σe, the molar volume V by V=Σv, and the SP value δ by δ=(E/V)

As specific examples of the monomer (c), 2-ethylhexyl (meth)acrylate[8.6], methyl (meth)acrylate[8.9], n-butyl (meth)acrylate[8.8], t-butyl (meth)acrylate[8.4], 2-(dimethylamino)ethyl (meth)acrylate[8.9], cyclohexyl (meth)acrylate[9.6], isobonyl (meth)acrylate[9.8], polyoxypropylene mono(meth)acrylate[8.7], and vinyl chloride [8.5] may preferably be mentioned. The numerals in the brackets [ ] are SP values. As the monomer (c), two or more monomers may be used in combination.

In the polymer (A), the proportion of polymerized units of the monomer (c) is preferably at most 30 mass %, and the total of polymerized units of the monomer (a), polymerized units of the monomer (b) and polymerized units of the monomer (c), is preferably at least 90 mass %.

Polymer (A) may contain polymerized units of a polymerizable monomer (hereinafter referred to as a monomer (e)) other than the monomer (a), the monomer (b) and the monomer (c). As the monomer (e), a polymerizable monomer having one or two polymerizable unsaturated groups, is preferred. Particularly preferred is a polymerizable monomer having one polymerizable unsaturated group.

As specific examples of the monomer (e), diacetone (meth)acrylamide[10.9], N,N-dimethyl (meth)acrylamide [10.5], benzyl (meth)acrylate [10.1], and vinylidene chloride [10.3], may preferably be mentioned. The numerals in the brackets [ ] are SP values.

The mass average molecular weight of polymer (A) is preferably from 5×10$^3$ to 5×10$^6$.

As a polymerization method to obtain polymer (A), emulsion polymerization or suspension polymerization is preferred. Particularly preferred is emulsion polymerization. The emulsion polymerization is preferably carried out by a method wherein the polymerizable monomer is emulsified by means of an aqueous medium such as water or a mixed medium of water and an alcohol, followed by polymerization. By such emulsion polymerization or the like, polymer (A) is obtained in a state dispersed in the form of particles in the aqueous medium (in a dispersion). As such emulsification method, high pressure emulsification by means of a homogenizer may be employed.

As the alcohol in the aqueous medium, ethanol, isopropyl alcohol, ethylene glycol, diethylene glycol, propylene glycol, dipropylene glycol, dipropylene glycol monomethyl ether, tripropylene glycol or hexylene glycol may, preferably, be mentioned.

In the polymerization reaction to obtain polymer (A), it is preferred to employ an oil-soluble polymerization initiator. As the oil-soluble polymerization initiator, a peroxide or an azo type compound is preferred. Particularly preferred is an azo type compound. As the azo type compound, 2,2'-azobis(2-methylpropionitrile), 2,2'-azobis(2-methylbutyronitrile), 2,2'-azobis(2,4-dimethylvaleronitrile), 1,1'-azobis(cyclohexane-1-carbonitrile) or dimethyl 2,2'-azobis(2-methylpropionate) may, for example, be preferably mentioned.

Further, in the polymerization reaction, a molecular weight controlling agent, for example, a mercaptan such as dodecylmercaptan, octadecylmercaptan or 2-hydroxyethylmercaptan, or α-methylstyrene dimer, may be added for the purpose of controlling the molecular weight of polymer (A) to be obtained.

An emulsifier may be present in the dispersion of polymer (A).

As such an emulsifier, a nonionic emulsifier, a cationic emulsifier or an amphoteric emulsifier is preferred. Particularly preferred is a non-ionic emulsifier.

The nonionic emulsifier may, for example, be a polyoxyethylene alkenyl ether, a polyoxyethylene alkyl ether, a polyoxyethylene alkyl phenyl ether, a polyoxyethylene polyoxyalkylene, an alkylamine polyoxyethylene, an alkylamide polyoxyethylene or an alkylamine oxide. Further, as the alkyl moiety in the above compound, an alkyl group of a straight chain structure or a branched structure having a carbon number of from 4 to 26 may be mentioned. Specifically, an octyl group, a dodecyl group, a tetradecyl group, a hexadecyl group, an octadecyl group or a behenyl group, may, for example, be mentioned.

As a specific example of the polyoxyethylene alkenyl ether, polyoxyethylene oleyl ether may be mentioned. As a specific example of the polyoxyethylene alkyl ether, polyoxyethylene octyl ether may be mentioned. As a specific example of the polyoxyethylene alkyl phenyl ether, polyoxyethylene octyl phenyl ether or polyoxyethylene nonyl phenyl ether may be mentioned.

The cationic emulsifier may, for example, be an amine salt, a quaternary ammonium salt or an oxyethylene-addition type quaternary ammonium salt. Specifically, a trimethylalkylammonium chloride, a dimethyldialkylammonium chloride, a monoalkylamine acetate, or an alkylmethyldi(polyoxyethylene)ammonium chloride may be mentioned. Preferred is octadecyltrimethylammonium chloride.

The amphoteric emulsifier may, for example, be an alanine, an imidazolinium betain, an amide betain or betain acetate. Specifically, dodecylbetain, octadecylbetain, dodecylcarboxymethyl hydroxyethylimidazolinium betain, betain dodecyldimethylaminoacetate or betain fatty acid amidepropyldimethylaminoacetate may, for example, be mentioned.

As the emulsifier, one type, or two or more types, may be used. When emulsifiers having different ionic properties are to be used in combination, a combination of a nonionic surfactant and a cationic surfactant, or a combination of a nonionic surfactant and an amphoteric surfactant, is preferred. Further, the amount of the emulsifier is preferably from 1 to 20 parts by mass, per 100 parts by mass of polymer (A). However, when polymer (A) contains a polymerizable monomer having a self emulsifying property, the amount of the emulsifier may be reduced.

The average particle size of polymer (A) is preferably from 0.03 to 0.3 $\mu$m. If the average particle size is less than 0.03 $\mu$m, a large amount of an emulsifier or a polymerizable monomer having a self emulsifying property, will be required to obtain a stable dispersion, and the water repellency tends to low. On the other hand, if it exceeds 0.3 $\mu$m, particles are likely to settle.

Polymer (B) is an addition polymer comprising less than 60 mass % (inclusive of 0 mass %) of polymerized units of the monomer (a) and at least 30 mass % of polymerized units of the monomer (c), and, if necessary, polymerized units of a polymerizable monomer (y) other than the monomers (a) and (c), wherein the total of the polymerized units of the monomer (a) and the polymerized units of the monomer (c) is at least 50 mass %. In polymer (B), the polymerized units of the monomer (a) is preferably at most 40 mass %, and no polymerized units of the monomer (a) may be contained.

In a case where polymer (B) contains polymerized units of the monomer (a), the monomer (a) has the same meaning as the monomer (a) in polymer (A). The monomer (a) in polymer (B) may be the same or different from the monomer (a) in polymer (A), or two or more monomers (a) may be used in combination.

The monomer (c) in polymer (B) has the same meaning as the monomer (c) in polymer (A). The monomer (c) in polymer (B) may be the same or different from the monomer (c) in polymer (A), or two or more monomers (c) may be used in combination.

If necessary, polymer (B) may contain polymerized units of a polymerizable monomer (y) (hereinafter referred to as a monomer (y)) other than polymerizable monomers (a) and (c). At least one type of polymerized units of the monomer (y) is preferably polymerized units of a polymerizable monomer (d). The polymerizable monomer (d) (hereinafter referred to as a monomer (d)), is a (meth)acrylic acid derivative compound having a cross-linkable functional group and is a monomer other than the monomer (b).

The cross-linkable functional group in the monomer (d) may, for example, be an epoxy group, a carboxyl group, an amino group, a silyl group, an isocyanate group, a blocked isocyanate group, an N-methylol group or a hydroxyl group.

The monomer (d) may, for example, be preferably diglycidyl (meth)acrylate, 3-chloro-2-hydroxypropyl (meth)acrylate, (meth)acrylic acid, mono-2-(meth)acryloyloxyethyl succinate [$CH_2=C(CH_3)COOCH_2CH_2OCOCH_2CH_2COOH$], an oxime block product of 2-isocyanate ethyl (meth)acrylate, N-methylol (meth)acrylamide, N-butyrol (meth)acrylamide, 2-hydroxyethyl (meth)acrylate, 4-hydroxybutyl (meth)acrylate, diacetone (meth)acrylamide, or N,N-dimethyl (meth)acrylamide.

Polymer (B) may contain two or more types of polymerized units of the monomer (d).

The mass average molecular weight of polymer (B) is preferably from $5 \times 10^3$ to $5 \times 10^6$.

As a polymerization method to obtain polymer (B), emulsion polymerization or suspension polymerization may, for example, be preferred. Particularly preferred is emulsion polymerization. By such emulsion polymerization or the like, polymer (B) is obtained in a state dispersed in the form of particles in an aqueous solvent (in a dispersion).

The emulsion polymerization is preferably carried out by means of a polymerization initiator. As such a polymerization initiator, a peroxide or an azo type compound is preferred. Particularly preferred is an azo type compound. The azo type compound may, for example, be an oil-soluble polymerization initiator as described with respect to polymer (A), or a water-soluble polymerization initiator such as 2,2'-azobis(2-methylpropionamidine) hydrochloride, 2,2'-azobis[2-(2-imidazolin-2-yl)propane] hydrochloride or 2,2'-azobis[2-(2-imidazolin-2-yl)propane] sulfate hydrate.

Further, a molecular weight controlling agent may be added at the time of the polymerization reaction for the purpose of controlling the molecular weight of polymer (B) to be obtained. As such a molecular weight controlling agent, the molecular weight controlling agent as mentioned in the description of polymer (A) may preferably be employed.

An emulsifier may be present in the dispersion of polymer (B).

As the emulsifier, the nonionic emulsifier, the cationic emulsifier or the amphoteric emulsifier, as described with respect to polymer (A), is preferred. Particularly preferred is a nonionic emulsifier.

As the emulsifier, one type, or two or more types, may be used. In a case where emulsifiers having different ionic properties, are used in combination, a combination of a nonionic emulsifier and a cationic emulsifier, or a combination of a nonionic emulsifier and an amphoteric emulsifier, is preferred. Further, the amount of the emulsifier is preferably from 1 to 20 parts by mass per 100 parts by mass of polymer (B). However, in a case where polymer (B) contains a polymerizable monomer having a self-emulsifying property, the amount of the emulsifier may be reduced.

The average particle size of polymer (B) is preferable from 0.03 to 0.3 $\mu$m. If the average particle size is less than 0.03 $\mu$m, a large amount of the emulsifier or the polymerizable monomer having a self-emulsifying property, will be required to obtain a stable dispersion, and the water repellency tends to be low. On the other hand, if it exceeds 0.3 $\mu$m, particles are likely to settle.

In the water repellent composition of the present invention, polymer (A) and polymer (B) are not present in the same particles and constitute separate particles, respectively. It is preferred to prepare the water repellent composition of the present invention by carrying out separate polymerization reactions to obtain polymer (A) and polymer (B), respectively, to form separate particles thereby to obtain respective dispersion and then mixing the respective dispersions.

In the water repellent composition, the mass ratio of polymer (A) to polymer (B) is preferably (A)/(B)=10/90 to 90/10, particularly preferably 20/80 to 80/20. If the ratio of polymer (A) to polymer (B) is within the above range, the composition will be excellent in water repellency and also in durability of the water repellency. Further, the solid content concentration is preferably from 0.1 to 50 mass parts.

In order to provide various physical properties to an article such as a fiber product, a polymer other than polymer (A) or (B), a water repellent, an oil repellent, a catalyst to accelerate crosslinking, a drape-controlling agent, an antistatic agent, a penetrant, an insecticide, a flame retardant, an anticrease-shrink proofing agent, a dye-stabilizer or pH-controlling agent, may, for example, be incorporated, as the case requires, to the water repellent composition of the present invention.

The water repellent composition of the present invention may be diluted to an optional concentration and applied to an article, depending upon the particular purpose or application. For its application to an article, an optional method may be employed depending upon the type of the article, the formulation of the composition, etc. For example, a method may be employed wherein it is deposited on the surface of an article by a covering method such as dipping or coating, followed by drying. Further, if necessary, it may be applied together with a suitable crosslinking agent, and heat treatment may be carried out.

As a method for treating an article for water repellency, a method of immersing the article in the water repellent composition comprising polymer (A) and polymer (B), is preferred. Also preferred is a water repellent treating method wherein an article is immersed in a composition containing polymer (B) and not containing polymer (A) and then immersing it in a composition containing polymer (A) and not containing polymer (B), since substantially the same effects can be obtained.

The article to be treated by means of the water repellent composition of the present invention is not particular limited, and it may, for example, be preferably fibers, fiber fabrics or fiber knitted products. The fibers may, for example, be animal or plant natural fibers such as cotton, hemp, wool and silk, synthetic fibers such as polyamide, polyester, polyvinyl alcohol, polyacrylonitrile, polyvinyl chloride and polypropylene, semisynthetic fibers such as rayon and acetate, inorganic fibers such as glass fibers and carbon fibers, or mixed fibers thereof.

The article treated with the water repellent composition of the present invention has excellent water repellency and is excellent also in the durability of the water repellency.

Now, the present invention will be described with reference to Preparation Examples (Examples 1 to 4, 24 and 25 (Preparation Examples for polymer (A)), and Examples 6 to 8 and 26 (Preparation Examples for polymer (B))), Comparative Examples (Example 5 (Comparative Preparation Example for polymer (a)), and Examples 9 and 10 (Comparative Preparation Examples for polymer (B))) Working Examples (Examples 11 to 16, 23 and 27 to 29), and Comparative Examples (Examples 17 to 22).

EXAMPLE 1

Into a 1 l glass container, 130.0 g of a perfluoroalkylethyl acrylate (a mixture of compounds of the formula $F(CF_2)_n(CH_2)_2OCOCH=CH_2$ wherein n is an integer of from 6 to 16, and the average of n is 9, which is hereinafter referred to as FA), 62.0 g of octadecyl acrylate (hereinafter referred to as STA), 4.0 g of 2-hydroxyethyl acrylate (hereinafter referred to as HEA), 4.0 g of 4-hydroxybutyl acrylate (hereinafter referred to as HEA), 0.6 g of dodecylmercaptan (hereinafter referred to as DMC), 10.0 g of polyoxyethyleneoleyl ether (HLB value=16, hereinafter referred to as POE), 1.0 g of octadecyltrimethylammonium chloride (hereinafter referred to as ODT), 20 g of dipropylene glycol monomethyl ether (hereinafter referred to as DPGMME) and 300 g of deionized water, were introduced. The mixture was emulsified under 40 MPa by means of a high pressure emulsifier, while maintaining it at 60° C.

Then, it was transferred to a 1 l glass autoclave, and 0.6 g of 2,2'-azobis(2-methylbutyronitrile) (hereinafter referred to as AVM) was added. Then, the autoclave was flushed with nitrogen. With stirring, the temperature was raised to 70° C., and a polymerization reaction was carried out for 15 hours to obtain a milky white emulsion. The emulsion had a solid content concentration of 38.7 mass % and an average particle size of 0.12 $\mu$m. The emulsion was diluted with deionized water so that the solid content concentration became 20 mass %, to obtain a dispersion (E1).

EXAMPLE 2

Into a 1 l glass container, 180.0 g of FA, 20.0 g of cyclohexyl methacrylate (hereinafter referred to as CHMA), 0.6 g of DMC, 10.0 g of POE, 1.0 g of ODT, 20 g of propylene glycol (hereinafter referred to as PG) and 300 g of deionized water, were introduced. The mixture was emulsified under 40 MPa by means of a high pressure emulsifier, while maintaining it at 60° C.

Then, it was transferred to a 1 l glass autoclave, and 0.6 g of AVM was added. Then, the autoclave was flushed with nitrogen. With stirring, the temperature was raised to 70° C., and a polymerization reaction was carried out for 15 hours to obtain a milky white emulsion. The emulsion had a solid content concentration of 38.6 mass % and an average particle size of 0.11 μm. The emulsion was diluted with deionized water so that the solid content concentration became 20 mass %, to obtain a dispersion (E2).

EXAMPLE 3

Into a 1 l glass container, 142.0 g of FA, 12.0 g of dioctyl maleate (hereinafter referred to as DOM), 4.0 g of N-methyl acrylamide (hereinafter referred to as NMAA), 0.6 g of DMC, 10.0 g of POE, 1.0 g of ODT, 20 g of PG and 300 g of deionized water, were introduced. The mixture was emulsified under 40 MPa by means of a high pressure emulsifier, while maintaining it at 60° C.

Then, it was transferred to a 1 l glass autoclave, and 1.2 g of AVM was added. Then, the autoclave was flushed with nitrogen. Further, 42.0 g of vinyl chloride (hereinafter referred to as VC) was added. With stirring, the temperature was raised to 70° C., and a polymerization reaction was carried out for 15 hours to obtain a milky white emulsion. The emulsion had a solid content concentration of 38.4 mass % and an average particle size of 0.10 μm. The emulsion was diluted with deionized water so that the solid content concentration became 20 mass %, to obtain a dispersion (E3).

EXAMPLE 4

Into a 1 l glass container, 170.0 g of FA, 16.0 g of methyl methacrylate (hereinafter referred to as MMA), 14.0 of styrene (hereinafter referred to as ST), 0.6 g of DMC, 10.0 g of POE, 1.0 g of ODT, 20 g of PG and 300 g of deionized water, were introduced. The mixture was emulsified under 40 MPa by means of a high pressure emulsifier, while maintaining it at 60° C.

Then, it was transferred to a 1 l glass autoclave, and 0.6 g of AVM was added. Then, the autoclave was flushed with nitrogen. With stirring, the temperature was raised to 70° C., and a polymerization reaction was carried out for 15 hours to obtain a milky white emulsion. The emulsion had a solid content concentration of 38.6 mass % and an average particle size of 0.11 μm. The emulsion was diluted with deionized water so that the solid content concentration became 20 mass %, to obtain a dispersion (E4).

EXAMPLE 5

Into a 1 l glass container, 120.0 g of FA, 6.0 g of DOM, 20.0 g of MMA, 20.0 g of vinylidene chloride (hereinafter referred to as VDC), 0.6 g of DMC, 10.0 g of POE, 1.0 g of ODT, 20 g of PG and 300 g of deionized water, were introduced. The mixture was emulsified under 40 MPa by means of a high pressure emulsifier, while maintaining it at 60° C.

Then, it was transferred to a 1 l glass autoclave, and 1.2 g of AVM was added. Then, the autoclave was flushed with nitrogen. Further, 30.0 g of VC was added. With stirring, the temperature was raised to 70° C., and a polymerization reaction was carried out for 15 hours to obtain a milky white emulsion. The emulsion had a solid content concentration of 38.5 mass % and an average particle size of 0.12 μm. The emulsion was diluted with deionized water so that the solid content concentration became 20 mass %, to obtain a dispersion (E5).

EXAMPLE 6

Into a 1 l glass container, 80.0 g of FA, 60.0 g of CHMA, 60.0 g of glycidyl methacrylate (hereinafter referred to as GMA), 1.2 g of DMC, 8.0 g of POE, 2.0 g of polyoxyethylene oleyl ether (HLB value=14), 1.0 g of ODT, 20 g of PG and 360 g of deionized water, were introduced. The mixture was emulsified under 40 MPa by means of a high pressure emulsifier, while maintaining it at 60° C.

Then, it was transferred to a 1 l glass autoclave, and 0.6 g of AVM was added. Then, the autoclave was flushed with nitrogen. With stirring, the temperature was raised to 70° C., and a polymerization reaction was carried out for 15 hours to obtain a milky white emulsion. The emulsion had a solid content concentration of 35.0 mass % and an average particle size of 0.11 um. The emulsion was diluted with deionized water so that the solid content concentration became 20 mass %, to obtain a dispersion (E6).

EXAMPLE 7

Into a 1 l glass container, 60.0 g of FA, 100.0 g of CHMA, 36.0 g of GMA, 4.0 g of HBA, 1.2 g of DMC, 10.0 g of POE, 1.0 g of an alkyltrimethylamine acetate (alkyl group: coconut, hereinafter referred to as ATM), 20 g of PG and 360 g of deionized water, were introduced. The mixture was emulsified under 40 MPa by means of a high pressure emulsifier, while maintaining it at 60° C.

Then, it was transferred to a 1 l glass autoclave, and 0.6 g of 2,2'-azobis(2-amidinopropane) dihydrochloride (hereinafter referred to as AVA) was added. Then, the autoclave was flushed with nitrogen. With stirring, the temperature was raised to 50° C., and a polymerization reaction was carried out for 15 hours to obtain a milky white emulsion. The emulsion had a solid content concentration of 35.0 mass % and an average particle size of 0.13 μm. The emulsion was diluted with deionized water so that the solid content concentration became 20 mass %, to obtain a dispersion (E7).

EXAMPLE 8

Into a 1 l glass container, 120.0 g of CHMA, 60.0 g of GMA, 20.0 g of MMA, 1.2 g of DMC, 8.0 g of POE, 2.0 g of a nonionic emulsifier ("Surfynol 465", tradename, manufactured by Air Products and chemicals, HLB value=13), 1.0 g of ATM, 20 g of PG and 360 g of deionized water, were introduced. The mixture was emulsified under 40 MPa by means of a high pressure emulsifier, while maintaining it at 60° C.

Then, it was transferred to a 1 l glass autoclave, and 0.6 g of AVM was added. Then, the autoclave was flushed with nitrogen. With stirring, the temperature was raised to 70° C., and a polymerization reaction was carried out for 15 hours to obtain a milky white emulsion. The emulsion had a solid content concentration of 35.1 mass % and an average particle size of 0.11 μm. The emulsion was diluted with deionized water so that the solid content concentration became 20 mass %, to obtain a dispersion (E8).

EXAMPLE 9

Into a 1 l glass container, 100 g of FA, 20.0 g of STA, 80.0 g of MMA, 0.6 g of DMC, 10.0 g of POE, 1.0 g of ODT, 20 g of PG and 360 g of deionized water, were introduced. The mixture was emulsified under 40 MPa by means of a high pressure emulsifier, while maintaining it at 60° C.

Then, it was transferred to a 1 l glass autoclave, and 0.6 g of AVM was added. Then, the autoclave was flushed with nitrogen. With stirring, the temperature was raised to 70° C., and a polymerization reaction was carried out for 15 hours to obtain a milky white emulsion. The emulsion had a solid content concentration of 35.0 mass % and an average particle size of 0.12 μm. The emulsion was diluted with deionized water so that the solid content concentration became 20 mass %, to obtain a dispersion (E9).

EXAMPLE 10

Into a 1 l glass container, 140 g of FA, 40.0 g of CHMA, 10.0 g of MMA, 10.0 g of HBA, 1.2 g of DMC, 10.0 g of POE, 1.0 g of ATM, 20 g of PG and 360 g of deionized water, were introduced. The mixture was emulsified under 40 MPa by means of a high pressure emulsifier, while maintaining it at 60° C.

Then, it was transferred to a 1 l glass autoclave, and 0.6 g of AVA was added. Then, the autoclave was flushed with nitrogen. With stirring, the temperature was raised to 50° C., and a polymerization reaction was carried out for 15 hours to obtain a milky white emulsion. The emulsion had a solid content concentration of 35.2 mass % and an average particle size of 0.10 μm. The emulsion was diluted with deionized water so that the solid content concentration became 20 mass %, to obtain a dispersion (E10).

EXAMPLES 11 TO 22

Dispersions E1 to E10 prepared in Examples 1 to 10 were mixed in the proportions (mass %) as shown in Table 1 and diluted with deionized water so that the solid content concentration became 15 mass %. Then, a melamine resin ("M-3", tradename, manufactured by Sumitomo Chemical Co., Ltd.) and a melamine catalyst ("ACX", tradename, manufactured by Sumitomo Chemical Co., Ltd.) were added so that each became 0.3 mass %, to obtain a treating liquid.

Using a nylon taffeta cloth as a test cloth, the test cloth was immersed in the treating liquid, and the test cloth was squeezed between two rubber rollers to a wet pick up of 60 mass %. Then, the test cloth was dried at 110° C. for 90 seconds and further subjected to heat treatment at 170° C. for 60 seconds. With respect to the test cloth after the treatment, the water repellency was evaluated by the following method.

Further, the durability test (hereinafter referred to as HL80) of the test cloth was carried out by repeating washing 80 times by a water washing method as prescribed in attached Table 103 of JIS L0217, followed by drying with hot air, whereupon the evaluation was carried out. The results are shown in Table 3.

EXAMPLE 23

A treating liquid (liquid A) was prepared by diluting with deionized water, so that dispersion E1 prepared in Example 1 became 10.0 mass %, the melamine resin "M-3" became 0.15 mass % and the melamine catalyst "ACX" became 0.15 mass %.

Further, a treating liquid (liquid B) was prepared by diluting with deionized water so that dispersion E6 prepared in Example 6 became 5.0 mass %, the melamine resin "M-3" became 0.15 mass % and the melamine catalyst "ACX" became 0.15 mass %.

Using nylon taffeta as a test cloth, the test cloth was immersed in liquid B, and the test cloth was squeezed between two rubber rollers to a wet pick up of 60 mass %. Then, the test cloth was immersed in liquid A, and then the test cloth was squeezed between two rubber rollers. It was then dried at 110° C. for 90 seconds and further subjected to heat treatment at 170° C. for 60 seconds. With respect to the test cloth after the treatment, the water repellency was evaluated in the same manner as in Example 11. The results are shown in Table 3.

EXAMPLE 24

Into a 1 l glass container, 122.0 g of $F(CF_2)_6(CH_2)_2OCOCH=CH_2$, 70.0 g of $H(CH_2)_{24}OCOC(CH_3)=CH_2$, 3.0 g of HEA, 2.0 g of HBA, 3.0 g of NMAA, 0.6 g of DMC, 10.0 g of POE, 1.0 g of ODT, 20 g of DPGMME and 300 g of deionized water, were introduced. The mixture was emulsified under 40 MPa by means of a high pressure emulsifier, while maintaining it at 60° C.

Then, it was transferred to a 1 l glass autoclave, and 0.6 g of AVM was added. Then, the autoclave was flushed with nitrogen. With stirring, the temperature was raised to 70° C., and a polymerization reaction was carried out for 15 hours to obtain a milky white emulsion. The emulsion had a solid content concentration of 38.0 mass % and an average particle size of 0.13 μm. The emulsion was diluted with deionized water so that the solid content concentration became 20 mass %, to obtain a dispersion (E24).

EXAMPLE 25

A milky white emulsion was obtained in the same manner as in Example 24 except that instead of 122.0 g of $F(CF_2)_6(CH_2)_2OCOCH=CH_2$, 100.0 g of $F(CF_2)_4(CH_2)_2OCOCH=CH_2$ (hereinafter referred to as FB), 22.0 g of $F(CF_2)_{12}(CH_2)_2OCOCH=CH_2$ and 70.0 g of $H(CH_2)_{18}OCOCH=CH_2$, were used. The emulsion had a solid content concentration of 38.2 mass % and an average particle size of 0.12 μm. The emulsion was diluted with deionized water so that the solid content concentration became 20 mass %, to obtain a dispersion (E25).

EXAMPLE 26

Into a 1 l glass container, 80.0 g of FEB, 60.0 g of CHMA, 60.0 g of GMA, 1.2 g of DMC, 10.0 g of POE, 1.0 g of ODT, 20 g of PG and 360 g of deionized water, were introduced. The mixture was emulsified under 40 MPa by means of a high pressure emulsifier, while maintaining it at 60° C.

Then, in the same manner as in Example 24, a milky white emulsion was obtained. The emulsion had a solid content concentration of 34.6 mass % and an average particle size of 0.12 μm. The emulsion was diluted with deionized water so that the solid content concentration became 20 mass % to obtain a dispersion (E26).

EXAMPLES 27 TO 29

In the same manner as in Example 11, dispersions were mixed in the proportions (mass %) as identified in Table 1, to obtain a treating liquid and a test cloth was prepared, whereupon the water repellency was evaluated. The results are shown in Table 3.

Evaluation of Water Repellency

Evaluation was carried out by the spray test of JIS L1092 (provided that the amount of water sprayed was 0.25 l or 1 l, and the temperature of water was 27° C.) and represented by the water repellency grades, as identified in Table 2.

Symbol +(−) attached to the water repellency grades indicates that the respective properties are slightly better (worse).

TABLE 1

| Ex. 11 | E1 (80%), E6 (20%) |
|---|---|
| Ex. 12 | E2 (50%), E7 (50%) |
| Ex. 13 | E3 (75%), E8 (25%) |
| Ex. 14 | E4 (85%), E6 (15%) |
| Ex. 15 | E4 (90%), E7 (10%) |
| Ex. 16 | E2 (80%), E8 (20%) |
| Ex. 17 | E5 (80%), E6 (20%) |
| Ex. 18 | E3 (80%), E9 (20%) |
| Ex. 19 | E2 (75%), E10 (25%) |
| Ex. 20 | E5 (80%), E9 (20%) |
| Ex. 21 | E2 (100%) |
| Ex. 22 | E6 (100%) |
| Ex. 27 | E24 (50%), E6 (50%) |
| Ex. 28 | E25 (45%), E6 (55%) |
| Ex. 29 | E1 (60%), E26 (40%) |

TABLE 2

| Water repellency ratings | State |
|---|---|
| 100 | No sticking or wetting is observed on the surface |
| 90 | Slight sticking and wetting observed on the surface |
| 80 | Partial wetting observed on the surface |
| 70 | Wetting observed on the surface |
| 50 | Wetting observed over the entire surface |
| 0 | Complete wetting observed on both sides |

TABLE 3

| | Initial water repellency | | Water repellency after HL80 | |
|---|---|---|---|---|
| | 0.25 l | 1 l | 0.25 l | 1 l |
| Ex. 11 | 100 | 100 | 90+ | 90 |
| Ex. 12 | 100 | 100 | 90+ | 90 |
| Ex. 13 | 100 | 100 | 90+ | 90 |
| Ex. 14 | 100 | 100 | 90 | 80+ |
| Ex. 15 | 100 | 100 | 90 | 80+ |
| Ex. 16 | 100 | 100 | 90+ | 90 |
| Ex. 17 | 100 | 90+ | 80 | 70+ |
| Ex. 18 | 100 | 90 | 50 | 50 |
| Ex. 19 | 100 | 90 | 50 | 50 |
| Ex. 20 | 100 | 100 | 70 | 70− |
| Ex. 21 | 100 | 100 | 50 | 0 |
| Ex. 22 | 90 | 90 | 50 | 50 |
| Ex. 23 | 100 | 100 | 90+ | 90 |
| Ex. 27 | 90+ | 90 | 90 | 80 |
| Ex. 28 | 100 | 90 | 90 | 80+ |
| Ex. 29 | 100 | 90 | 90 | 80+ |

The water repellent composition of the present invention is capable of imparting excellent water repellency and its durability to an article.

The entire disclosures of Japanese Patent Application No. 2000-333065 filed on Oct. 31, 2000 and Japanese Patent Application No. 2001-293600 filed on Sep. 26, 2001 including specifications, claims and summaries are incorporated herein by reference in their entireties.

What is claimed is:

1. A water repellent composition comprising the following polymer (A) and the following polymer (B), wherein the polymer (A) and the polymer (B) are not present in the same particles:

Polymer (A): an addition polymer comprising at least 60 mass % of polymerized units of the following polymerizable monomer (a) and at most 40 mass % (inclusive of 0 mass %) of polymerized units of the following polymerizable monomer (b), and polymerized units of a polymerizable monomer (c), wherein the total of the polymerized units of the polymerizable monomer (a) and the polymerized units of the polymerizable monomer (b) is at least 70 mass %; and Polymer (B): an addition polymer comprising less than 60 mass % (inclusive of 0 mass %) of polymerized units of the polymerizable monomer (a) and at least 30 mass % of polymerized units of the polymerizable monomer (c), and, if necessary, polymerized units of a polymerizable monomer other than the polymerizable monomers (a) and (c), wherein the total of the polymerized units of the polymerizable monomer (a) and the polymerized units of the polymerizable monomer (c) is at least 50 mass %:

Polymerizable monomer (a): a (meth)acrylate having a polyfluoroalkyl group;

Polymerizable monomer (b): a (meth)acrylate having a long chain alkyl group and not having a polyfluoroalkyl group; and Polymerizable monomer (c): a polymerizable monomer other than the polymerizable monomers (a) and (b), having a SP value of less than 10.

2. The water repellent composition according to claim 1, wherein the polymer (B) is an addition polymer containing polymerized units of the following polymerizable monomer (d) as at least one type of polymerized units of a monomer other than the polymerizable monomers (a) and (c):

Polymerizable monomer (d): a polymerizable monomer other than the polymerizable monomer (b), which is a (meth)acrylic acid derivative compound having a cross-linkable functional group.

3. The water repellent composition according to claim 1, wherein in the polymer (A), the mass ratio of polymerized units of the polymerizable monomer (a)/polymerized units of the polymerizable monomer (b) is at least 2.

4. The water repellent composition according to claim 1, wherein the polymer (A) is an addition polymer polymerized by means of an oil-soluble polymerization initiator.

5. The water repellent composition according to claim 1, wherein the polymerizable monomer (c) is cyclohexyl methacrylate.

6. The water repellent composition according to claim 2, wherein in the polymer (A), the mass ratio of polymerized units of the polymerizable monomer (a)/polymerized units of the polymerizable monomer (b) is at least 2.

7. The water repellent composition according to claim 2, wherein the polymer (A) is an addition polymer polymerized by means of an oil-soluble polymerization initiator.

8. The water repellent composition according to claim 2, wherein the polymerizable monomer (c) is cyclohexyl methacrylate.

9. An article treated with the water repellent composition as defined in claim 1.

10. The water repellant composition according to claim 1, wherein polymerizable monomer (c) in polymer (B) is the same as polymerizable monomer (c) in polymer (A).

11. The water repellant composition according to claim 2, wherein polymerizable monomer (c) in polymer (B) is the same as polymerizable monomer (c) in polymer (A).

12. An article treated with the water repellent composition as defined in claim 2.

13. An article treated with the water repellent composition as defined in claim 2.

* * * * *